United States Patent

[11] 3,552,682

| [72] | Inventor | Ralph E. Walsh |
| | | Long Branch, N.J. |
| [21] | Appl. No. | 769,609 |
| [22] | Filed | Oct. 22, 1968 |
| [45] | Patented | Jan. 5, 1971 |
| [73] | Assignee | Breeze Corporations, Inc. |
| | | Union, N.J. |
| | | a corporation of New Jersey |

[54] LEVEL WIND DEVICE
7 Claims, 6 Drawing Figs.

[52] U.S. Cl. ................................................. 242/158.3
[51] Int. Cl. ................................................. B65h 54/28
[50] Field of Search ........................................ 242/158.3,
158.2, 158.4, 158.5, 158, 158.1, 158.4(A), 54

[56] References Cited
UNITED STATES PATENTS

| 959,621 | 5/1910 | Sessions | 242/158.3X |
| 2,424,380 | 7/1947 | Barker | 242/158.3 |
| 3,270,982 | 9/1966 | Prange | 242/158.3 |

FOREIGN PATENTS

| 125,424 | 9/1947 | Australia | 242/158.3 |

*Primary Examiner*—Stanley N. Gilreath
*Attorney*—Albert F. Kronman

ABSTRACT: A level wind assembly for use with cables having electronic sensing elements attached thereto which permits the cables to be reeled in and laid upon a drum despite the projecting sensing elements. The level wind mechanism is swingably mounted and cammed out of the path of the sensing devices without interference with its cable orienting drive.

INVENTOR.
RALPH E. WALSH
ATTORNEY

INVENTOR.
RALPH E. WALSH
BY
ATTORNEY 3,552,682

LEVEL WIND DEVICE

BACKGROUND OF THE INVENTION

It is often necessary to handle cables to which various electronic or cable-orienting devices are attached. Mine-sweeping activities in which a cable is pulled through the water by a helicopter or oceanographic exploration are specific examples of activities with such requirements. When it is desired to reel in the cable it is necessary to pass the cable through a suitable level wind device in order to lay it upon the drum for storage. However, conventional level wind devices cannot accept any variations in cable diameter inasmuch as the cable passes through a forked guide on its way to the drum.

Accordingly, it is the object of the present invention to provide a level wind assembly which can accept cable to which various elements, such as electronic sensing devices have been attached.

SUMMARY OF THE INVENTION

The present invention relates to a level wind assembly for a winch in which the level wind screw and guide are suspended at each end by arms swingably mounted upon the winch frame. The level wind screw is driven by means of a gear train which is concentric with a pinion on a shaft carried within the cable drum. In this manner, the arms which support the level wind screw may be lifted upwardly without disengaging the gear train. The cable guide is provided with a cam structure which will raise the level wind screw and guide in the event that an element of a diameter larger than the cable is encountered. During reel-out operations the level wind assembly may be swung out of the way or the same cam arrangement may be employed to permit the electronic sensing elements to pass through the level wind assembly.

DESCRIPTION OF THE DRAWINGS

In the accompanying drawings forming part hereof, corresponding parts have been given identical reference numerals and in which drawings.

DESCRIPTION OF THE PREFERRED EMBODIMENTS

Figure 1:
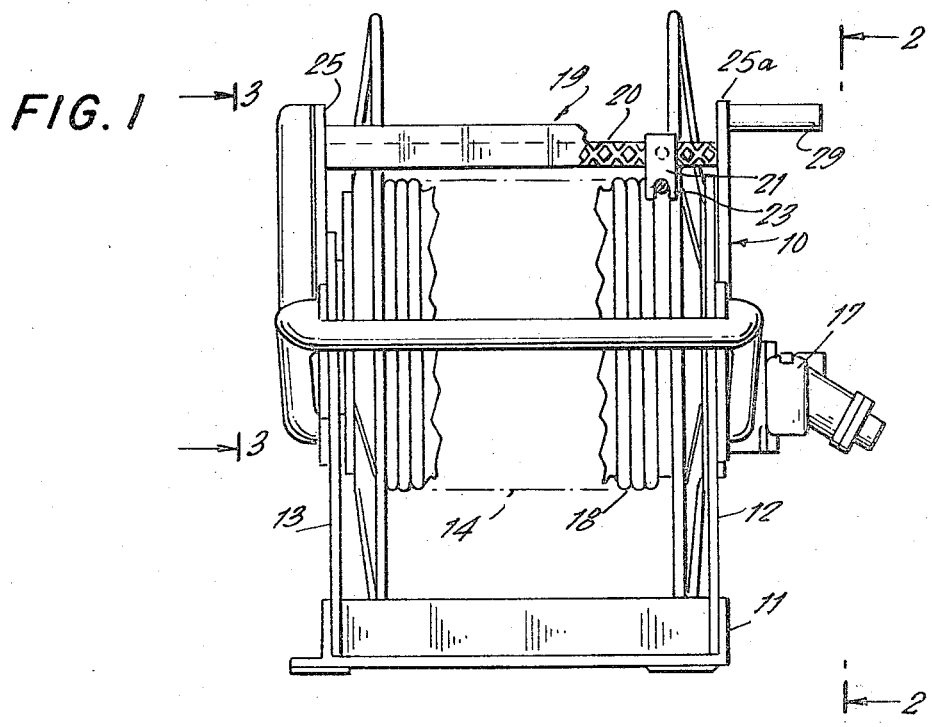
FIG. 1 is a view in front elevation of a complete embodiment of the present invention with certain parts shown in dashed lines.
Figure 2:
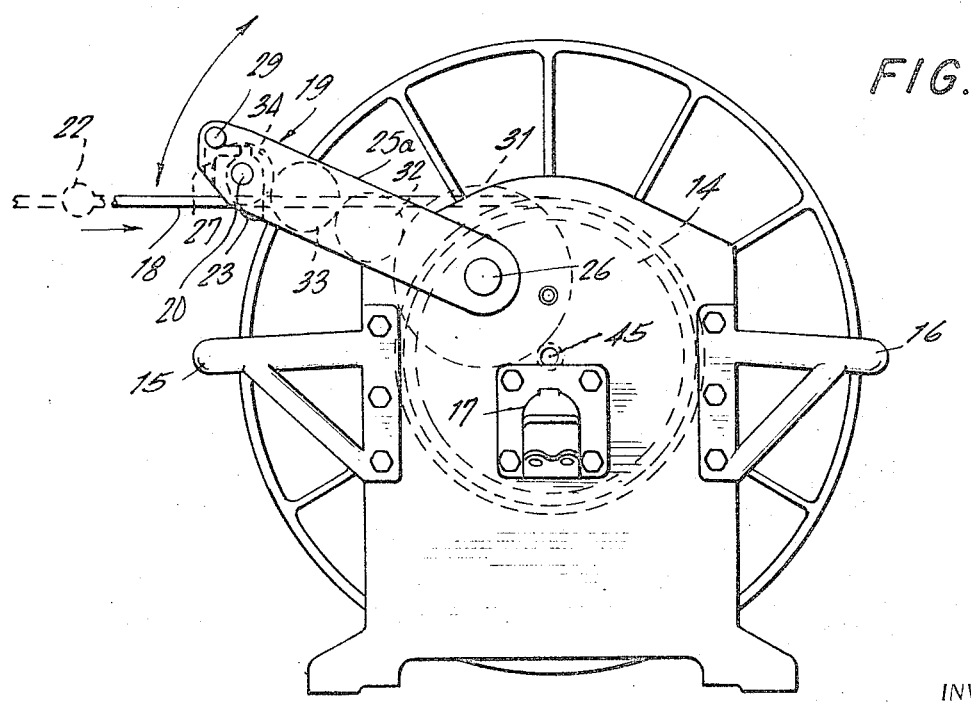
FIG. 2 is a view in side elevation taken on line 2–2 in FIG. 1 looking in the direction of the arrows.
Figure 4:
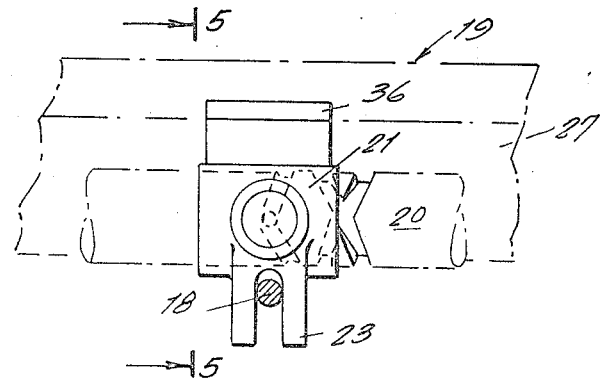
FIG. 4 is a fragmentary view somewhat enlarged in front elevation of the level wind screw and nut assembly.

Referring to the drawings and particularly to FIGS. 1 and 2, 10 indicates a winch assembly having a base 11, side frames 12, 13 and a drum 14 rotatably mounted between the side frames 12, 13. The side members 12, 13 of the frame are further reinforced by cross support members 15, 16.

Power for the winch is supplied by a motor 17. Power is transmitted from the motor 17 to the drum 14 through a gear train (not shown) carried within the drum 14. The manner in which the drum 14 is driven by the motor 17 and the gear train is well-known and forms no part of the present invention.

A cable 18, is received upon the drum 14 in the well-known manner and guided into a layup by means of a level wind structure 19. The level wind structure 19 consists essentially of a double helical screw 20, and a nut 21 which rides upon the screw 20.

Figure 5:
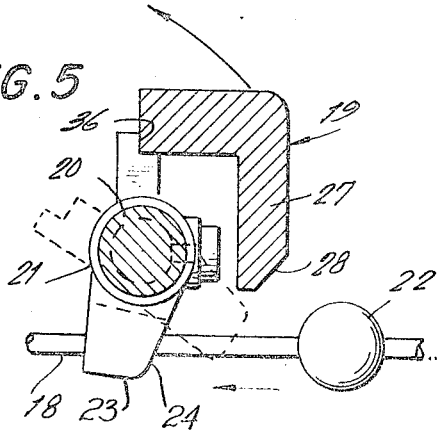
FIG. 5 is a cross-sectional view taken on line 5–5 in FIG. 4 looking in the direction of the arrows.

The present winch 10 is specifically adapted to reel in cables 18 to which one or more electronic sensing devices 22 have been attached. Electronic sensing devices 22 are usually of a diameter greater than that of the cable 18 and would normally be obstructed by the forked portion 23 which constitutes the cable guide for the level wind nut 21. However, as best shown in FIG. 5, the guide 23 is provided with a cam face 24 which is disposed at a 60° angle with respect to the vertical. As a result, when the electronic sensing device 22 engages the cam face 24, the level wind assembly 19 is forced upwardly until the guide 23 rides over the electronic sensing device 22, and again descends to engage the cable 18.

The upward movement of the level wind assembly 19 is made possible by reason of the fact that the level wind assembly 19 is supported at each end by spaced arms 25, 25a pivotedly supported at 26 on the side frames 12, 13. A guide bar 27 having a somewhat L-shaped cross section is secured at each end to the arms 24a, 25 as best shown in FIG. 1 and overlies the level wind screw 20. The guide bar 27 is beveled at its lower leading edge as indicated at 28 to further guide the cable 18 and electronic sensing devices 22 beneath the nut 21.

It will be observed that as cable 18 is laid upon the drum 14 in successive layers, the outside diameter of the laid cable will increase. The swingable arms 25, 25a under these circumstances will be raised by reason of the level wind nut guide 23 so that the guide 23 remains in intimate contact with the cable 18 at all times during reel-in operations.

In addition, since it is not necessary to use the level wind mechanism during reel-out operations, the swingable arms, 25, 25a, make it possible to remove the level wind guide 23 from the cable 18 during reel-out operations. A handle 29 secured to the arm 25a permits the arms to be swung upwardly for this purpose.

Figure 3:
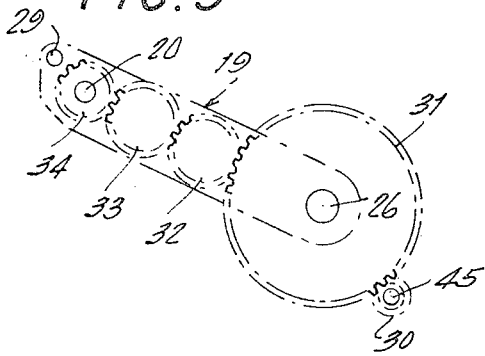
FIG. 3 is a fragmentary view in side elevation taken on line 3–3 in FIG. 1 looking in the direction of the arrows.

Power to the level wind screw 20 is supplied from the motor 17 through a shaft 45 axially carried by the drum 14 to a pinion gear 30 (see FIG. 3) secured to the end of the shaft.

A spur gear 31 freely carried by the level wind arm pivot pin 26 is in mesh with the pinion gear 30. A series of freely rotating gears 32, 33, are in mesh with each other and with pivot gear 31 to form a gear train which transmits the rotary motion of the drum shaft 45 to a gear 34 keyed to the level wind screw 20. It will be observed that due to the size of the pinion gear 30 and the pivot gear 31 there is a substantial gear reduction achieved which will impart the proper rate of travel to the level wind nut 21 as it is driven back and forth across the screw 20. The pivot gear 31 also permits the arm 25 to be swung about the pivot pin 26 without disengaging the gear train or level wind screw from the pinion gear 30. The nut 21 therefore remains in proper orientation with respect to the cable on the drum at all times.

It will be observed from an examination of FIG. 5 that the guide 23, in addition to riding upon the level wind screw 20, is provided with a guide-bearing surface 36 which slides against the back of the guide bar 27. The cam 24 is thereby prevented from rotating in a clockwise direction under the impact of the electronic sensing device 22 as the cable 18 is reeled in. However, in the event that the arms 25, 25a are not swung upwardly during reel out, the guide 23 can rotate in a counterclockwise direction, as best shown in FIG. 5 in dashed lines, to permit the electronic sensing devices 22 to slide below the level wind assembly without interrupting the passage of the cable 18.

Figure 6:
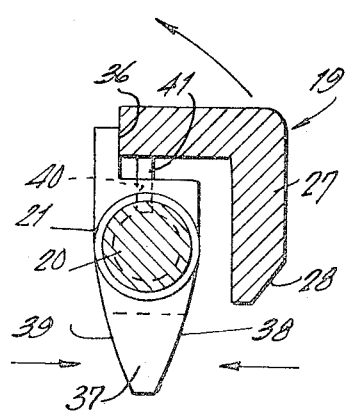
FIG. 6 is a view similar to FIG. 5 showing a second embodiment of the invention.

Referring to FIG. 6, there is shown a further embodiment of the present invention in which the guide 23 is replaced by a cam structure 37 in the form of a somewhat symmetrical cam having cam faces 38, 39, on the front and rear face thereof. In this embodiment of the invention a transverse keyway 40 is provided in the top of the cam 37 to receive an elongated key 41 carried by the cam 37. The key 41 prevents the cam 37 from rotating as a result of the impact of the electronic sensing devices 22 and serves as a guide for the transverse travel of the level wind nut 21. The cam 37 is further reinforced against the impact of the electronic devices during the reel-in phase of operation by means of a guide-bearing surface 36 at the top thereof identical in construction with that shown in connection with FIG. 5. In all other respects the operation of the embodiment shown in FIG. 6 is similar to that herein above referred to with the exception that in this form of the invention, the cam 37 will not rotate on the reel-out operation, but rather the entire level wind assembly will be lifted upwardly upon the arms 25, 25a in the event that the electronic sensing devices 22 strike it from either direction.

It will be understood that a level wind is not normally necessary for reel-out operations. However, in the event the level wind is not swung out of the way during reel-out, the above described structure will serve to prevent winch, cable or sensing element damage.

I claim:

1. A winch level wind device comprising a winch frame, spaced side members on the frame, a drum rotatably supported between the frame side members, a cable for said winch, a source of rotary power on the frame, a shaft driven by the source of rotary power, a gear secured to the shaft, spaced arm members pivotally secured at one end to the side frame members extending radially outward of the drum, a spur gear freely journaled on one of the arm members in mesh with the driven shaft gear, a gear train carried by the said arm in mesh with the spur gear, a level wind screw journaled at each end in the arm members and extending across the drum, a gear at one end of the screw in mesh with the last gear train member, a level wind nut threaded upon the screw, a cable guide extending outwardly from said nut, a forked portion on said guide to receive the cable therebetween and a cammed face on the reel-in face of the forked portion.

2. A level wind device according to claim 1 in which a guide bar is disposed between the spaced arm members, a trailing edge on said guide bar and the nut is provided with an upstanding portion in contact with the trailing edge whereby the nut can rotate upon the level wind screw in only one direction.

3. A level wind device according to claim 1 in which the cammed face is disposed at an angle of the order of 60° with respect to the vertical.

4. A level wind device according to claim 2 in which the guide bar is beveled at the lower leading edge thereof and is substantially L-shaped in cross section.

5. A level wind device according to claim 1 in which a guide bar of substantially L-shaped cross section is disposed in front of the level wind screw and nut, provided with an elongated key extending from a surface facing the nut, and the nut is formed with a recess to receive the key whereby rotary motion of the nut with respect to the bar is prevented.

6. A level wind device according to claim 5 in which the forked portion of the nut is provided with opposed cammed faces symmetrical about the vertical axial plane of said nut.

7. A level wind device according to claim 6 in which each cam is of the order of 60° with respect to the vertical.